United States Patent [19]
Carlbaum et al.

[11] Patent Number: 5,997,605
[45] Date of Patent: Dec. 7, 1999

[54] METHOD OF PRODUCING MATING PARTS

[75] Inventors: Nils Carlbaum, Ödåkra; Björn Johansson, Höganäs, both of Sweden

[73] Assignee: Höganäs AB, Höganäs, Sweden

[21] Appl. No.: 09/281,925

[22] Filed: Mar. 31, 1999

Related U.S. Application Data

[63] Continuation of application No. PCT/SE97/01731, Oct. 15, 1997.

[30] Foreign Application Priority Data

Oct. 15, 1996 [SE] Sweden .................................. 9603805

[51] Int. Cl.$^6$ ..................................................... C22C 33/02
[52] U.S. Cl. ................................ 75/246; 419/28; 419/29; 419/38; 419/44
[58] Field of Search ................................. 419/28, 29, 38, 419/44; 75/246

[56] References Cited

U.S. PATENT DOCUMENTS

| | | |
|---|---|---|
| 2,553,935 | 5/1951 | Parks et al. . |
| 3,993,054 | 11/1976 | Newman . |
| 4,923,674 | 5/1990 | Weber . |
| 4,936,163 | 6/1990 | Hoag et al. . |
| 5,460,776 | 10/1995 | Ackermann et al. ..................... 419/44 |
| 5,613,182 | 3/1997 | Lynn . |

FOREIGN PATENT DOCUMENTS

| | | |
|---|---|---|
| 06511166A1 | 5/1995 | European Pat. Off. . |
| 0696688A1 | 2/1996 | European Pat. Off. . |
| 3904020A1 | 8/1990 | Germany . |

*Primary Examiner*—Ngoclan Mai
*Attorney, Agent, or Firm*—Burns, Doane, Swecker & Mathis, L.L.P.

[57] ABSTRACT

The present invention concerns a method of producing powder-metallurgical compacted components, which during subsequent processing are split into individual parts mating in pairs, sintered and optionally heat-treated and remated. According to the process, an iron-based powder is compacted, the obtained green body is fracture-split into at least two parts, which are subsequently sintered and optionally heat-treated. The obtained sintered parts are then remated.

20 Claims, No Drawings

METHOD OF PRODUCING MATING PARTS

This is a continuation of International Application No. PCT/SE97/01731, filed Oct. 15, 1997, that designates the United States of America and which claims priority from Swedish Application No. 9603805-4, filed Oct. 15, 1996.

The invention relates to a method of producing powder compacted metal components, which during subsequent processing are separated into individual parts mating in pairs, sintered and optionally heat-treated. The invention is of specific interest for the production of connecting rods but also other fields of application, such as parted sliding bearings, bearing cages etc., fall within the scope of the invention.

BACKGROUND ART

Connecting rods were originally made by casting or forging separate attachable cap and body portions. These parts were usually made of medium carbon wrought steel and were separately machined at both joining and thrust faces; they were then separately drilled with holes to accept fasteners.

A first evolutionary step was to cast or forge the connecting rod as a single steel piece, followed by drilling of holes to accept fasteners. The single piece was sawn to obtain cap and body portions which were separately rough-machined at the thrust and contacting surfaces; the two portions were then bolted together for finish-machining. The separate steps of machining and sawing were not only cumbersome and expensive, but they did also not ensure a perfectly matched cap and body under the operating forces. Under some operating conditions, inherent diametrical fastener clearance permitted slight shifting of the cap and body portions, which in turn affected the bearing life.

As the next step in this evolutionary change, a single-piece connection rod was split or cracked into cap and body portions in the hope of providing non-sliding surfaces, where the cap and the body portions are bolted together. It was hoped that if the surfaces were properly remated, the remate would prevent any microshifting and assure accurate operating alignment. To split the single piece into two, it was initially struck on one side with a sharp blow. This met the requirements with limited success because of the difficulty in controlling the crack propagation and the risk of plastic deformation and possible damage to the blank.

Further developments have been various methods of fast tearing parts from each other along a well defined notch, which can be machined, forged, laser-cut, etc. Also these methods may introduce small plastic deformations in the fracture surfaces, which in turn can cause difficult mating of the split parts.

Common features of all commercial production of connecting rods are a final machining step to ensure the position, straightness and roundness of the bores in the big and small ends of the rod to prepare for the assembly of the bearings or bushings. To split the single piece into two, it was initially struck on one side with a sharp blow. This met with little success because of the uncontrollability of the cracking plane and possible damage to the connecting rod.

More recent and improved methods of splitting are disclosed in e.g. U.S. Pat. Nos. 2,553,935, 3,993,054, and 4,923,674 (Krebsöge).

SUMMARY OF THE INVENTION

The present invention concerns a new method of producing powder-metallurgical, sintered, remating parts with essentially no microshifting or plastic deformation in the fracture surfaces. This method comprises the steps of
simultaneously compacting and forming an iron-based powder using a mold provided with a single die having cavities for shaping an integral green body;
green machining the green body;
fracture splitting the-green body-into at least two parts at intended dividing faces;
sintering the parts and
remating the parts at the dividing faces.

An optional machining of the sintered parts involving such as turning and milling may also performed.

Another optional step which may be included in the method according to the invention is a heat treatment of the sintered parts.

The iron-based powder can be selected from a wide variety of powders such as prealloyed powders, partly prealloyed powders or powder mixes containing elements such as Cu, Ni, Mo, Cr, Mn, C.

A critical feature of the invention is the green strength of the compacted green body, and in-order to obtain the desired green strength, different methods can be used. One method of obtaining high green strength is to subject the metal powder to compaction at an elevavated temperature. Such warm compaction can be carried out at a temperature of at least 100° C., preferably at least 120° C., and a pressure of at least 600 MPa. Another method which can be used is compaction at ambient temperature using a lubricated die. High green strength can also be obtained by using various green strength enhancing additives, such as polymers, or special lubricants giving high green strength. The exact value of the green strength depends on the subsequent processing of the green body. In general, it can be estimated that the green body should have a green strength of at least 20 MPa, preferably at least 25 MPa, and most preferably at least 30 MPa. In automated production, even higher green strength may be required. Green bodies having such high green strength values can easily and cost-effectively be machined to the desired shape.

An important feature of the invention is that the high green strength permits green machining of the green integral body. As machining is easily performed in the green state, materials which cannot be drilled/threaded in finished state can be used. Another advantage of performing this green machining is that the subsequent processing of the sintered parts to the final end use of the split type mechanical part will be facilitated. This means eg that the separate step for achieving a plastic deformation of the sintered parts suggested in EP patent publication 696 688 is eliminated.

In addition to the above mentioned advantages, it has been found that the splitting can be made with low forces, from which follows that simple fracture splitting apparatus can be used. An example of a simple splitting apparatus suitable for splitting a con rod big end consists of two half circle formed halves together fitting into the big end bore and a wedge arranged in the hole formed of the two halves. When the wedge is pressed in axial direction into the big end bore both parts of the con rod can easily be parted under controlled circumstances and with very low deformation. The risk that double cracks will be formed in the splitting plane is small.

Sintering of components for con rod materials can be carried out at 1080° C. to 1300° C., preferably between 1100° C. to 1150° C. for periods of 15 to 90, preferably 20 to 60, minutes. Examples of reducing atmospheres are ordinary endogas or various hydrogen/nitrogen mixtures.

Optionally the sintered parts can be subjected to a heat treatment, such through hardening or surface hardening. The heat treatment is selected in view of the final use of the sintered parts.

The accurate remating obtained by using the method according to the invention and the prevention of microshifting result from the fact that the split surface is as uneven as the particle size of the powder.

Metal powders are presently used in methods for making conventional forging of auto-engine connecting rods, but according to these methods, a combination of powder metallurgy and forging is used. These methods are said to improve weight control and provide a major increase in dimensional control. This combination has attracted much interest from the automotive industry.

In general, such a powder-forging process begins with loose metal powders blended to the required composition. A forging preform having the general shape of a connection rod is then produced in a standard P/M-compacting press. The "green" preform is sintered in a reducing atmosphere and transferred directly to a forging press. Forging is completed in a single stroke that also fully forms both the pin and the crank bores. Secondary operations can include double disk grinding, and shotpeening, depending on the type of the forging process.

Another process which has been proposed for making connecting rods of metal powders comprises compacting, presintering, machining, fracturing and final sintering.

The method according to the present invention, which eliminates the forging and presintering step, respectively, is thus new also in this respect.

The invention is further illustrated by the following non-limiting example meant to be a simulation of the joining area of a connecting rod big end. The invention is further illustrated by the following non-limiting example.

An iron-based powder Distaloy AE+0.8 C available from Höganäs AB, Sweden, was warm-compacted at a temperature of 130° C. and at a compaction pressure of 700 MPa to a green body in the form of a bar, 30×12×10 mm, having a density of 7.34 g/cm$^3$ and a green strength of 45–50 MPa. A clearance hole was drilled to half of the bar length and a through hole for thread cutting was drilled in the rest of the length of the bar. The through hole was formed with a M6×1 thread and the bar was split-fractured into two parts by bending. The parts were sintered at 1120° C. in endogas for 30 minutes. The parts were joined and the thread tested, where it was found that a green cut and sintered thread can perform equally to a thread in a standard nut with respect to tolerance and strength.

The following table shows the bolt force at various torque values for the green tapped body and a standard nut (ref. 1 and 2).

Splitting in green condition gave interparticular fractures resulting in rough, uneven surfaces which remained after sintering. No plastic deformation was observed in the fracture surfaces and the remating of the parts gave a snug fit, where the parts were unable to slide relative to each other. The through hole was threaded and the bar was split-fractured into two parts by bending. The parts were sintered at 1120° C. in endogas for 30 minutes. The thread was tested and it was found that a green cut thread was quite similar to that of a standard nut.

The following table shows the bolt force at different torque values for the green tapped body and a standard nut.

| Forces (kN) at different torques (Nm) | | | | |
|---|---|---|---|---|
| Torques Sample | 7.5 | 10 | 15 | 20 |
| 1 | 6 | 7.4 | 11 | 15 |
| 2 | 6.6 | 8.2 | 11.6 | 14.6 |
| 3 | 6 | 7.4 | 11 | 14.9 |
| 4 | 6.6 | 8.4 | 11.8 | 16 |
| 5 | 6.8 | 8.7 | 11.7 | 15.3 |
| Ref. 1* | 7.4 | 8.7 | 11.8 | 15.2 |
| Ref. 2* | 6.4 | 8.7 | 12.3 | 16.3 |

*Ref 1 and 2 standard nuts

Splitting in green condition gave interparticular fractures resulting in rough, uneven surfaces which remained after sintering. Remating of the parts gave a snug fit, where the parts were unable to slide relative to each other.

Although described for the production of connecting rods, it is obvious for a man skilled in the art that the method of the invention can be used also for other applications such as parted sliding bearings and bearing cages etc, where easy machining and accurate mating is of critical importance.

We claim:

1. A method of producing split-type mechanical parts comprising the steps of
   simultaneously compacting and forming an iron-based powder using a mold provided with a single die having cavities for shaping an integral green body;
   green machining the green body;
   fracture-splitting the green body into at least two parts at intended dividing faces;
   sintering the parts and
   remating the parts at the dividing faces.

2. Method according to claim 1, wherein the green body has a green strength of at least 20 MPa.

3. Method according to claim 1, wherein the compacting is performed by using warm compaction technique.

4. Method according to claim 1, wherein the compacting is performed in a lubricated die.

5. Method according to claim 1, wherein the metal powder includes a green strength enhancing agent.

6. Method according to claim 1, wherein a machining step is performed after the sintering step.

7. Method according to claim 1, wherein the sintered parts are subjected to a heat treatment.

8. Sintered parts mating in pairs, prepared from a machined and fracture-split green body, said green body being prepared from a compacted iron-based powder and having a green strength of at least 20 MPa.

9. Parts according to claim 8, wherein the green body has a green strength of at least 25 MPa.

10. Parts according to claim 8 for the production of connecting rods.

11. Method according to claim 1, wherein the green body has a green strength of at least 25 MPa.

12. Method according to claim 1, wherein the green body has a green strength of at least 30 MPa.

13. Method according to claim 2, wherein the compacting is performed by using warm compaction technique.

14. Method according to claim 11, wherein the compacting is performed by using warm compaction technique.

15. Method according to claim 12, wherein the compacting is performed by using warm compaction technique.

16. Method according to claim 2, wherein the compacting is performed in a lubricated die.

17. Method according to claim 11, wherein the metal powder includes a green strength enhancing agent.

18. Method according to claim 11, wherein a machining step is performed after the sintering step.

19. Method according to claim 11, wherein the sintered parts are subjected to a heat treatment.

20. Parts according to claim 9 for the production of connecting rods.

* * * * *